(12) United States Patent
Friggstad

(10) Patent No.: US 6,374,922 B1
(45) Date of Patent: Apr. 23, 2002

(54) FOLDING FRAME IMPLEMENT

(75) Inventor: Terrence Friggstad, Grasswood (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/424,218

(22) PCT Filed: May 21, 1998

(86) PCT No.: PCT/CA98/00486

§ 371 Date: Nov. 17, 1999

§ 102(e) Date: Nov. 17, 1999

(87) PCT Pub. No.: WO98/52402

PCT Pub. Date: Nov. 26, 1998

(30) Foreign Application Priority Data

May 21, 1997 (CA) ............................................ 2205456

(51) Int. Cl.[7] ............................................. A01B 63/32
(52) U.S. Cl. .................................................... 172/322
(58) Field of Search ............................. 172/210, 311, 172/322, 474, 478, 479, 480, 457, 482, 634, 635, 661, 321, 323

(56) References Cited

U.S. PATENT DOCUMENTS

| | | | | |
|---|---|---|---|---|
| 4,206,816 A | * | 6/1980 | Richardson et al. | 172/311 |
| 4,399,875 A | * | 8/1983 | Schaaf et al. | 172/311 |
| 4,450,917 A | * | 5/1984 | Hake | 172/328 |
| 6,209,657 B1 | * | 4/2001 | Friggstad | 172/322 |

FOREIGN PATENT DOCUMENTS

| | | | | |
|---|---|---|---|---|
| DE | 2537391 | * | 2/1977 | A01B/51/00 |
| EP | 0614604 A1 | * | 9/1994 | A01D/78/10 |
| FR | 2282210 | * | 10/1975 | A01B/35/30 |
| FR | 2707450 | * | 3/1995 | A01D/78/10 |

* cited by examiner

*Primary Examiner*—Robert E. Pezzuto
(74) *Attorney, Agent, or Firm*—Larry W. Miller; John William Stader

(57) ABSTRACT

A folding frame farm implement comprising: a) a cart (21), b) a multi-section rockshaft frame (20) mounted on said cart and oriented generally transversely in the working position, c) said rockshaft frame (20) having a central section (20c) and laterally disposed wing sections (20a, 20e), d) wheel means (2,3) supporting said rockshaft frame sections, e) said rockshaft frame sections being rotatable about a generally transverse axis between a 1st position and a 2nd position, f) a plurality of individual tool frame sections (27, 28) rotatably mounted to corresponding ones of said rockshaft frame sections about a generally transverse axis, g) individual wheel support means (29, 31) for each tool frame section, h) wherein said tool frame sections (27, 28) are supported at working positions at a variable height above the ground determined by the relative rotational position of the rockshaft frame (20) between said 1st position and said 2nd position and by the said wheel support means (29, 31), i) central tool frame section support means (31) associated with said central rockshaft frame section adapted to retain said central tool frame section (20c) in close proximity to the ground for transport, j) lift means to further rotate said wring frame tool sections (20a, 20c) from a generally horizontal position to a raised position for transport and k) said wind sections (20a, 20c) being foldable rearwardly for transport.

16 Claims, 19 Drawing Sheets

FOLDING FRAME IMPLEMENT

FIELD OF THE INVENTION

The present invention relates generally to tool bar implements used in agriculture to carry ground engaging tools for preparing the ground for planting or for carrying the planter units themselves for planting seed into the ground, and, more particularly, to a tool bar implement that converts from a wide, transversely extending working configuration to a narrow, longitudinally extending transport configuration.

BACKGROUND OF THE INVENTION

Modem farmers strive to improve the management of increasing amounts of farm acres. Improving management requires farmers to be able to quickly prepare the soil for each season's farming operations. This haste has driven the need for more efficient and larger farming equipment.

Implements such as harrows, packers, or combined harrow-packers were some of the earliest implements to be made with widths exceeding sixty feet in the field operating position. As tractor horsepower has increased over time, larger tillage implements have been made available. These larger implements require a mechanism for compactly folding the implement for practical and safe transport over the highway.

The conventional method of folding tillage implements is by folding wing sections along forward aligned axes such that the wings are folded to a generally upright position. Double folding wing sections may have outer sections that fold inwardly and downwardly from the ends of inner wing sections in five section winged implements. In the case of these conventional wing implements, the minimum implement width that can be achieved by such folding is limited by the width of the center section. As a result, road transport may still be somewhat restricted as these implements often exceed twenty feet or more in transport width.

Road transport standards in North America are beginning to follow the standards set in Europe in which maximum road transport widths and heights for agricultural implements are being defined. Large implements that have conventional folding wing sections are not able to be folded such that they fall within width and height limits that may be generally 3 meters wide and 4 meters high. Some U.S. states have adopted transport width limits of 13.5 ft.

Forward or rear folding implements provide some relief with respect to such transport limits. However, implements must also be made to function with the accurate seeding ability that conventionally folded implements have become capable of. Although some rear or forward folding multibar tillage implements have been developed, they do not demonstrate the accurate depth control required for farming operations.

It is therefor desirable to provide a folding tool bar implement that is operable to convert between transport and field operating configurations.

SUMMARY OF THE INVENTION

Accordingly, an important object of the present invention is to provide a folding tool bar implement that converts between transverse field operating configuration and a longitudinal transport configuration.

It is another object of the present invention to provide a folding tool bar implement having a rotatable rockshaft supported on one or more caster wheels.

It is a further object of the present invention to provide a caster wheel with a first caster axis and a second caster axis such that the caster wheel caster wheel pivots in all directions on a first caster axis when the implement is in a field operating configuration and may be steerably controlled on a second caster axis by an actuator.

It is yet another object of the present invention to provide a caster lock that engages and disengages by gravity.

It is a further object of the present invention to provide tool frames that pivot on the rockshaft to follow uneven ground and maintain depth of ground working tools.

It is an object of the present invention to provide a folding tool bar implement in which the tool frames are attached to the rockshaft via slotted members such that both pivotal motion and motion along the slot is allowed.

It is an advantage of the present invention that the tool frames are raised in sequence so that all the tool frames of all wing sections are not raised at once, thereby minimizing the stress of the rockshaft.

It is a further advantage of the present invention that the tool frames in one wing section are all raised at once to minimize the length of hose attachments for hydraulics or air-seed delivery.

It is another object of the present invention to provide a limiting linkage that pivots to an over-center position to lock the tool frames when they are fully raised to a transport position.

It is yet another object of the present invention to provide springs on the tool frames which abut members on the rockshaft when the tool frames are in the working configuration and which may be used to transfer weight from the rockshaft to the tool frames to bias the tool frames toward the ground.

It is a further object of the present invention to provide a transport lock that locks the wing sections adjacent the main section when they are rotated rearwardly for transport.

It is another object of the present invention to provide actuators for raising or lowering the wing sections in a range of working positions.

It is yet another object of the present invention to provide a link on the rockshaft that operates a hydraulic valve to allow operation of the caster wheels in transport configuration but not in the field operating position.

These and other objects, features, and advantages are accomplished according to the present invention by providing a folding tool bar implement that converts from a transversely extending operating configuration to a longitudinally extending transport configuration. The implement includes a rotating rockshaft having a pair of wing sections pivotally connected to the opposing lateral ends of a center section. A plurality of individual tool frames are pivotally connected to the rockshaft sections and extend rearwardly thereof. Each tool frame is also supported by a rearwardly positioned support wheel connected to the rockshaft by a connecting link. The conversion of the tool bar implement begins with the rotation of the rockshaft from a first position to a second position to re-orient the pivot axis connecting the wing sections to the center section into a vertical orientation. The tool frames corresponding to the wing sections are then raised into a vertical orientation so that the wing sections can be pivotally folded rearwardly with the vertical wing section tool frames being positioned over top of the center section tool frames.

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENTS

Figure 1:
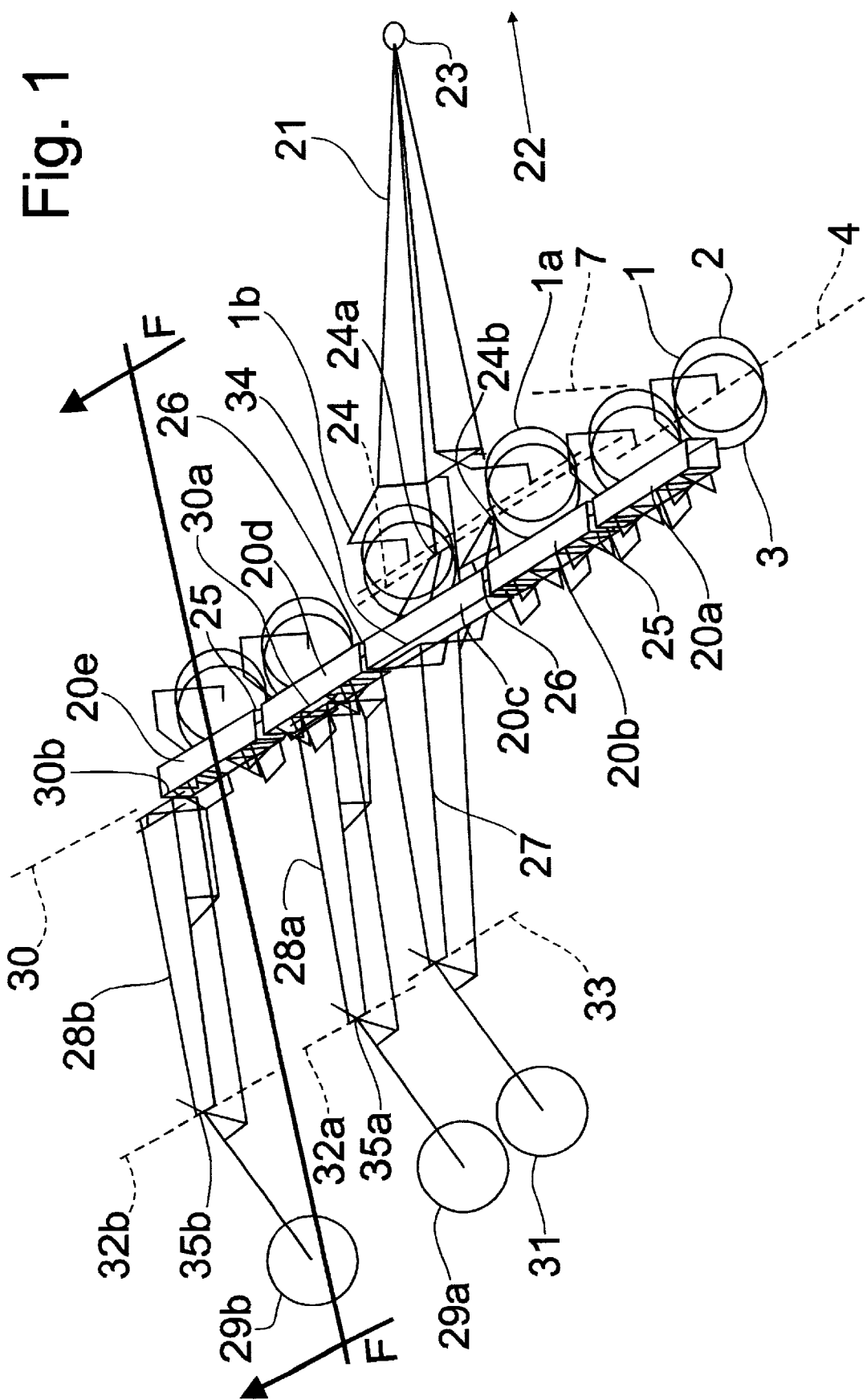
FIG. 1 is a schematic perspective view of a folding tool bar implement incorporating the principles of the instant invention, the representative tool frames being oriented in a lowered working position with the rockshaft rotated into the first position.
Figure 2:
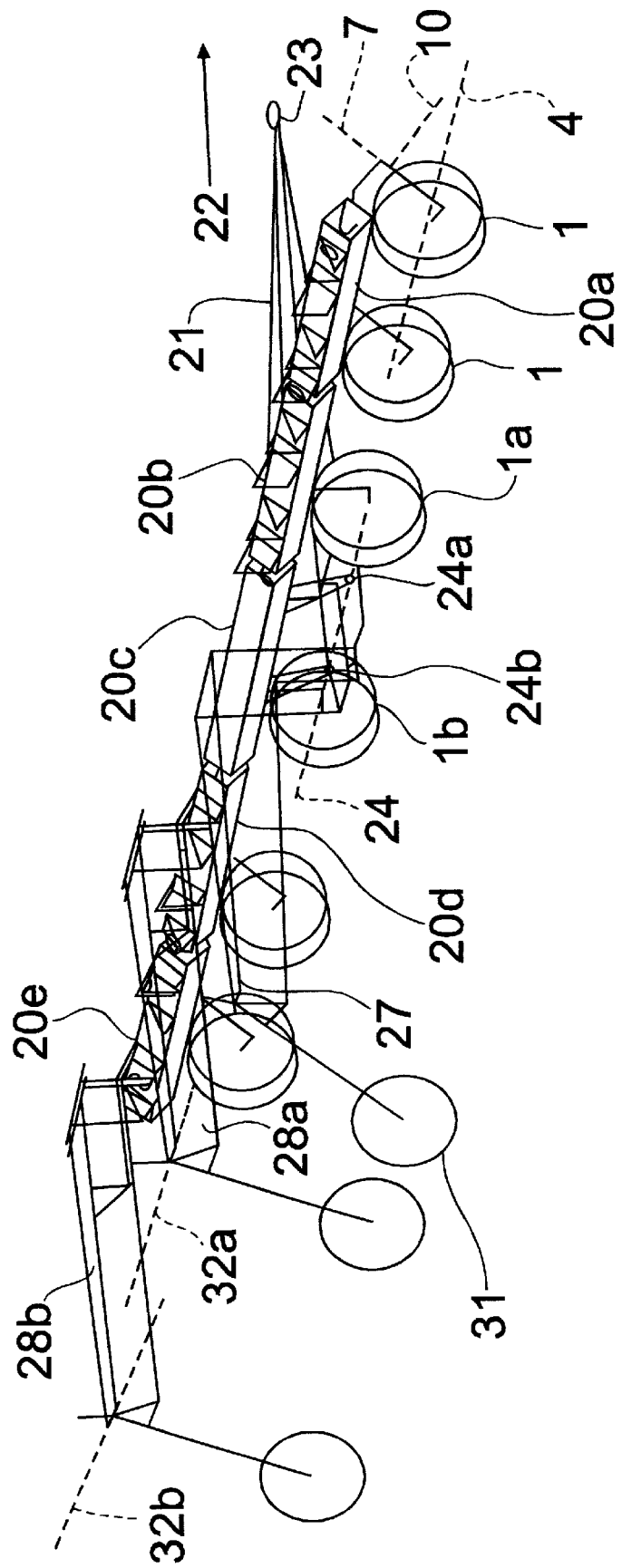
FIG. 2 is a schematic perspective view of the folding tool bar implement with the rockshaft rotated into an intermediate position to raise the tool frames into a raised headlands position.
Figure 3:
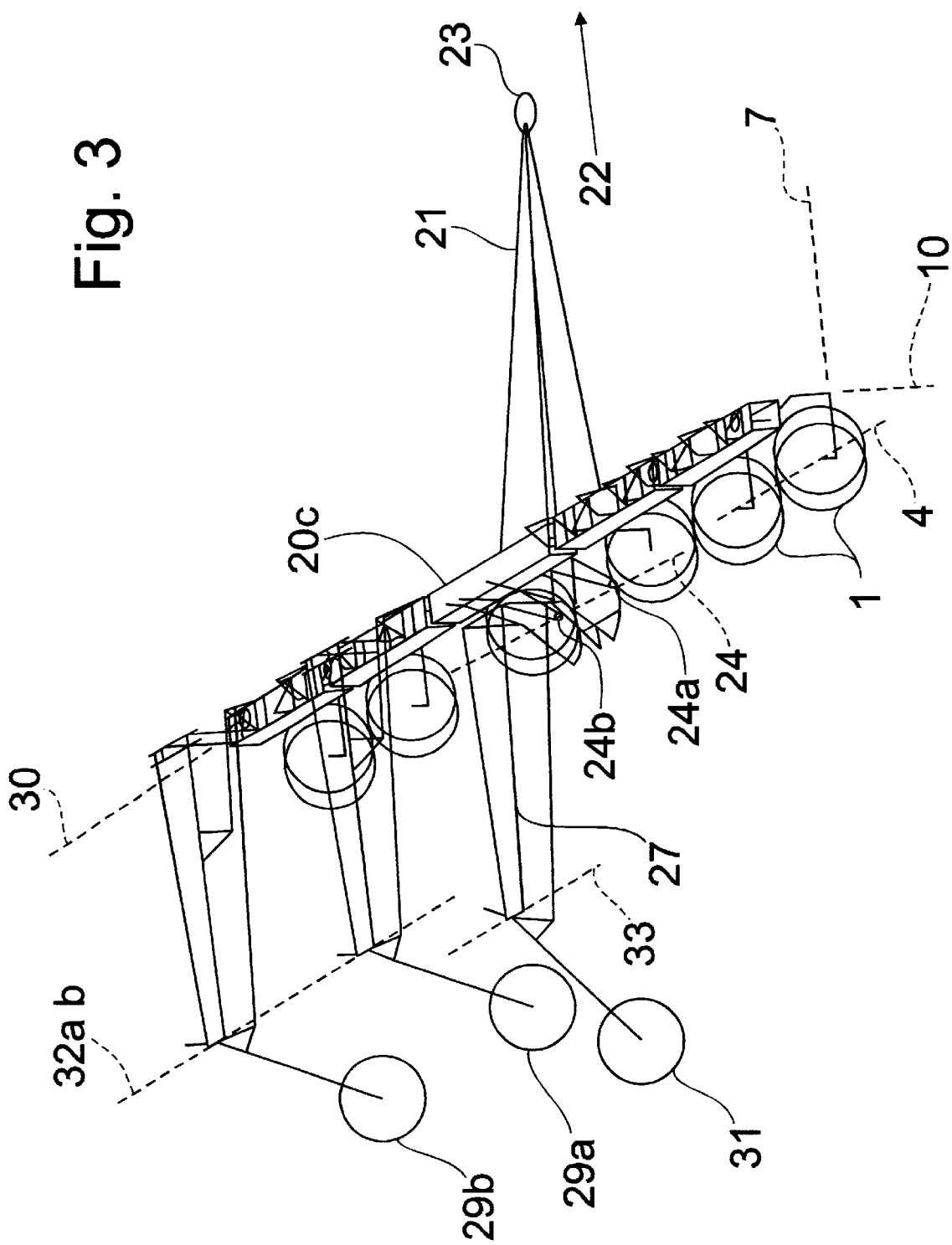
FIG. 3 is a schematic perspective view of the folding tool bar implement with the rockshaft fully rotated into the second position and the tool frames being positioned in the non-working position, the tool frames corresponding to the center section of the rockshaft being oriented into a lowered non-working position for compact folding of the implement.

Referring to FIGS. 1–3, an agricultural tool bar implement incorporating the principles of the present invention can best be seen. Any left and right references are used as a matter of convenience and are determined by standing at the rear of the implement and facing forwardly toward the hitch member connecting the implement to a prime mover and, therefore, into the direction of travel.

The draft frame 21 is supported for movement in the normal direction of travel indicated by arrow 22 by a conventional hitch mechanism 23 connectable to a prime mover (not shown), such as an agricultural tractor. At the rearward end of the implement frame 23, a rockshaft 20 is pivotally connected to the draft frame 23 by pivots 24a, 24b to define a transverse pivot axis 24 about which the rockshaft 20 is pivotable. Conventional hydraulic cylinders (not shown) interconnect the draft frame 23 and the rockshaft 20 to control the pivotal movement of the rockshaft 20 about the axis 24.

FIG. 1 shows the first rotated position of the rockshaft 20, which corresponds to the lowered working position of the implement with the implement in a transversely extending field operating configuration. In the configuration depicted in FIGS. 1 and 13, the castering first axis 7 of each walking beam assembly 1, which is described in greater detail below, is generally vertical, thus permitting the walking beam assemblies 1 to freely caster. The rockshaft 20 is formed as having a center section 20c supported on a pair of centrally located walking beam assemblies 1a and 1b, as well as being pivotally supported on the implement frame 23, and at least one wing section 20a, 20b positioned laterally of the center section 20c on each opposing side thereof. The wing sections 20a, 20b are also supported by walking beam assemblies 1.

Figure 14:
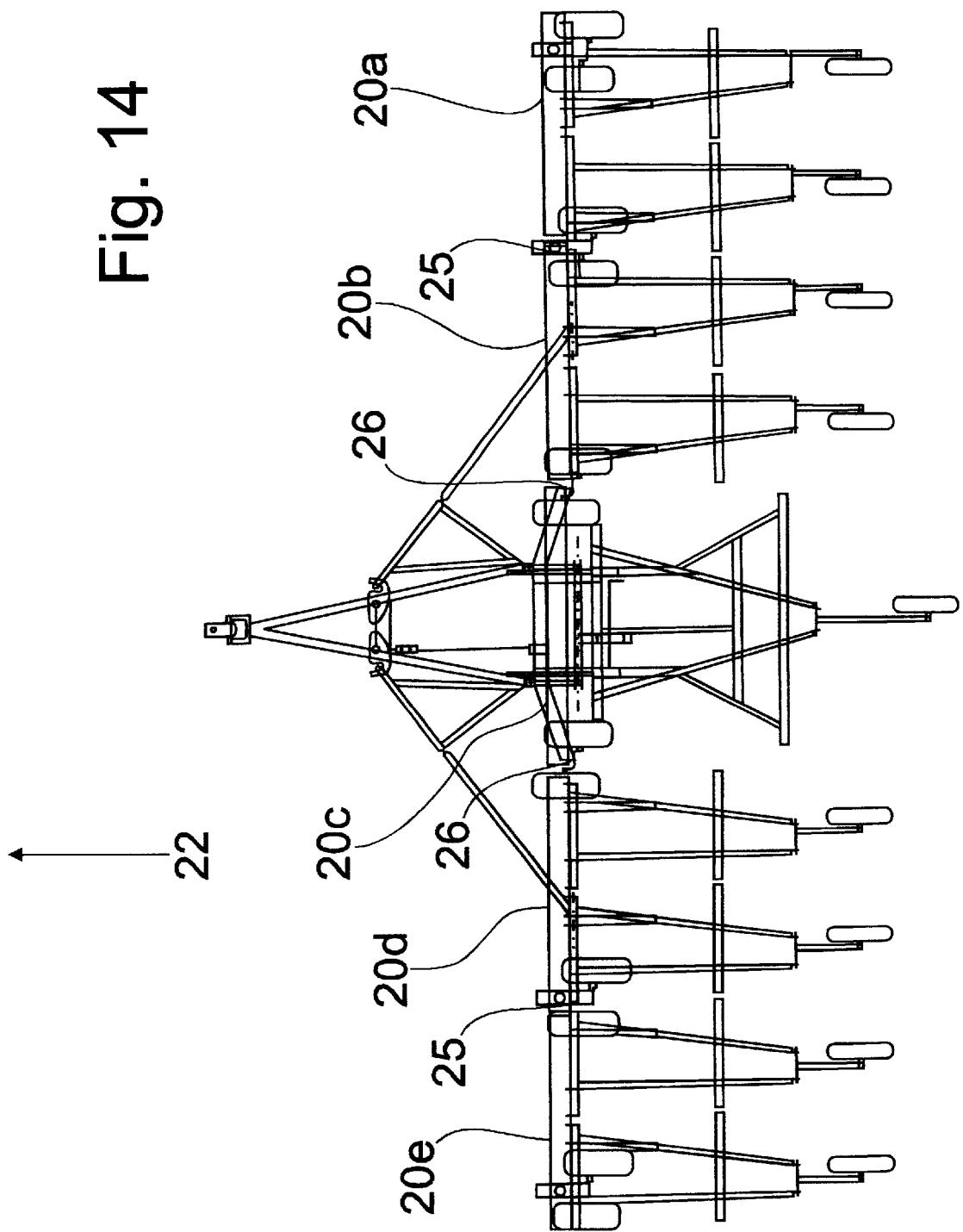
FIG. 14 is a schematic top plan view of the folding tool bar implement in the transverse field operating configuration with the tool frames raised into the non-working position, corresponding to the orientation depicted in FIG. 3.

The rockshaft 20 is rotatable about the axis 24 to a partially rotated intermediate position depicted in FIG. 2 to raise the tool frames 27, 28 into a raised headlands position in which the ground engaging tools (not shown) carried by the tool frames 27, 28 are raised just slightly out of the ground to permit a turning of the implement, such as is needed at the headlands of a field. In this intermediate position of the rockshaft 20, the castering axis 7 of the walking beams 1 is substantially tilted forwardly in the direction of travel 22. When the rockshaft 20 has been fully rotated into the second position, as depicted in FIGS. 3 and 14, the castering first axis 7 of each walking beam assemblies 1 is turned to a horizontal orientation, whereupon the axis 7 is locked, as will be described in greater detail below, to prevent a castering of the walking beam assemblies 1.

Figure 13:
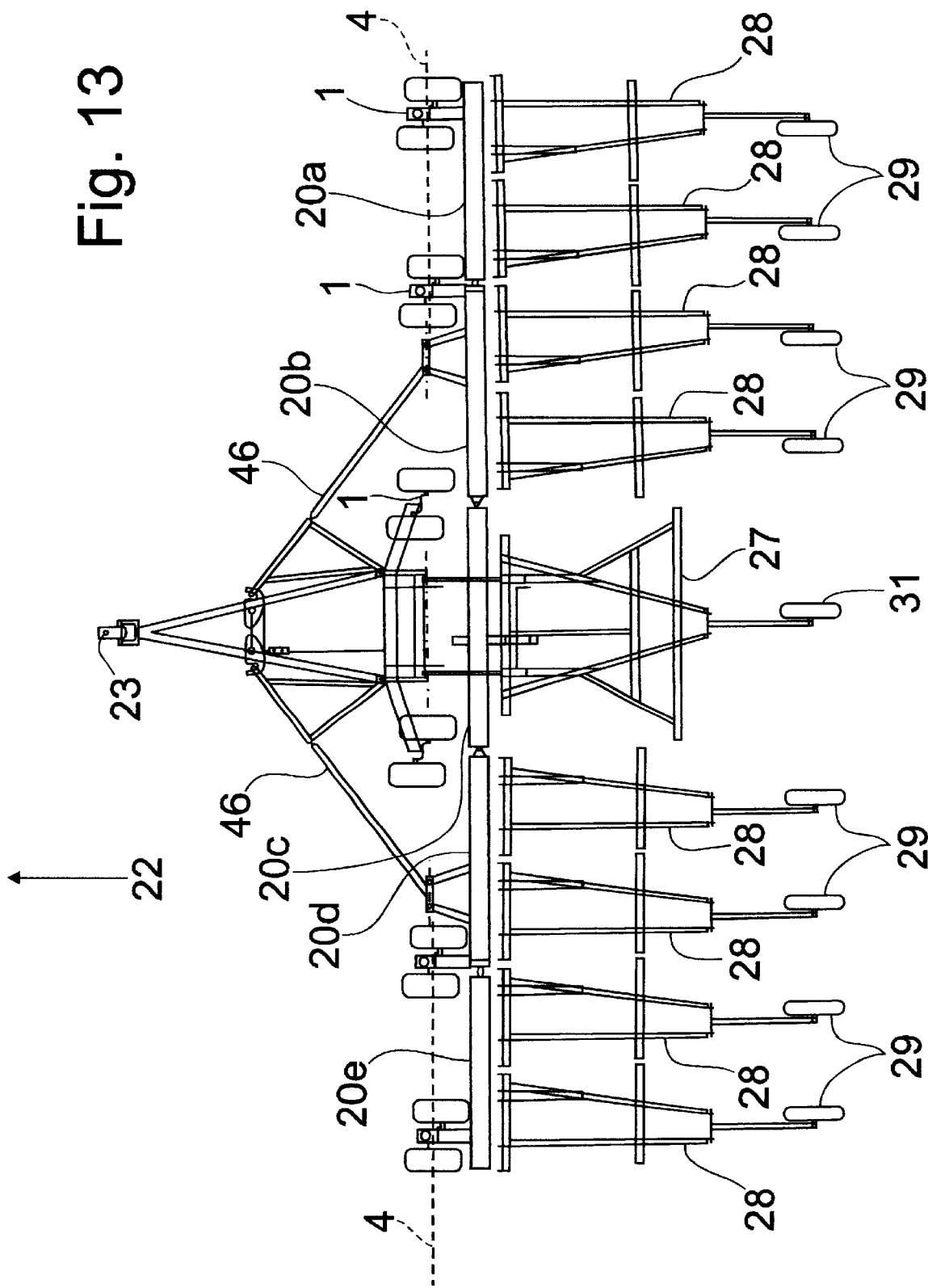
FIG. 13 is a schematic top plan view of the folding tool bar implement in the transverse field operating configuration with the tool frames lowered into the working position, corresponding to the orientation depicted in FIG. 1.

The rockshaft 20 may be configured into a three section member or a five section member, as shown in FIGS. 1–3. For the five section rockshaft 20, the outermost wing sections 20a, 20e are pivotally connected by the pivot 25 to the corresponding innermost wing sections 20b, 20d, which is generally horizontal and extending in a longitudinal direction when the implement is in the lowered working position. The innermost wing sections 20b, 20d are pivotally connected to the opposing ends of the center section 20c by a pivot 26 in the same manner in which the outermost wing sections 20a, 20e are connected to the innermost wing sections 20b, 20d. As best seen in FIGS. 13 and 14, the wing sections 20a, 20b, 20d, 20e are retained in the transversely extending field operating position by supports 46 interconnecting the wing sections to the respective sides of the draft frame 21.

The center section 20c is provided with a central tool frame 27 pivotally connected thereto and extending rearwardly thereof for pivotal motion about a transverse axis 34. The central tool frame 27 is also pivotally supported upon a rearward wheel assembly 31 which is pivotable relative to the tool frame 27 about a transversely extending axis 33. Each wing section 20a, 20b, 20d, 20e may carry one or more tool frames 28 (representatively shown by the tool frames 28a and 28b in FIGS. 1–3 for each of the left side wing sections shown in these Figures). Each wing section tool frame 28 is pivotally connected to the corresponding wing section 20a, 20b, 20d, 20e of the rockshaft 20 for relative motion about the transversely extending axis 30 (representatively shown by the pivots 30a, 30b in FIGS. 1–3). Each wing section tool frame 28 is also supported by a rear mounted wheel assembly 29 (representatively shown by wheel assemblies 29a, 29b in FIGS. 1–3) for relative pivotal motion about a transversely extending axis 32 (representatively shown in FIGS. 1–3 as axes 32a, 32b).

Each wheel assembly 29 is connected at a connection point 40 to a link 35 extending forwardly thereof for pivotal connection to the rockshaft 20 at the connection point 39. The link 35 serves as a four bar linkage to maintain the tool frame 28 generally horizontally and parallel to the ground throughout all working and non-working positions of the tool frame as depicted in FIGS. 1–3. The rotation of the rockshaft 20 from the first position toward the second position, as is shown in FIGS. 1–3 and 6–8, raises the forward end of the tool frames 28 and pulls the tool frames 28 forwardly. The links 35 cause rotation of the wheel assemblies 29 about the axis 32 to raise the rearward end of the tool frames 28 correspondingly, thereby maintaining the tool frame 28 parallel to the ground.

Figure 4:
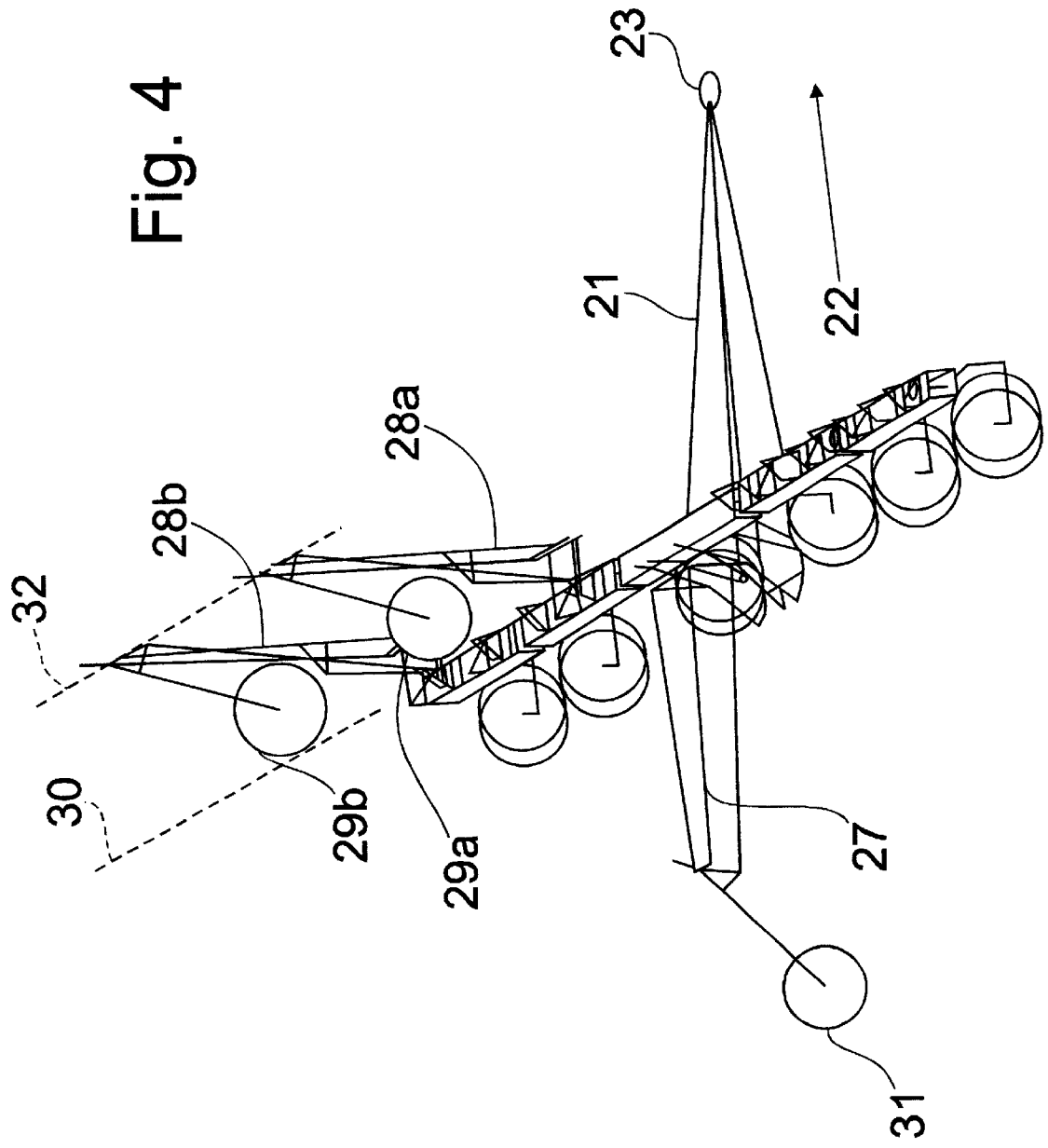
FIG. 4 is a schematic perspective view of the folding tool bar implement with the representative tool frames corresponding to the wing sections being raised into a vertical transport position.
Figure 5:
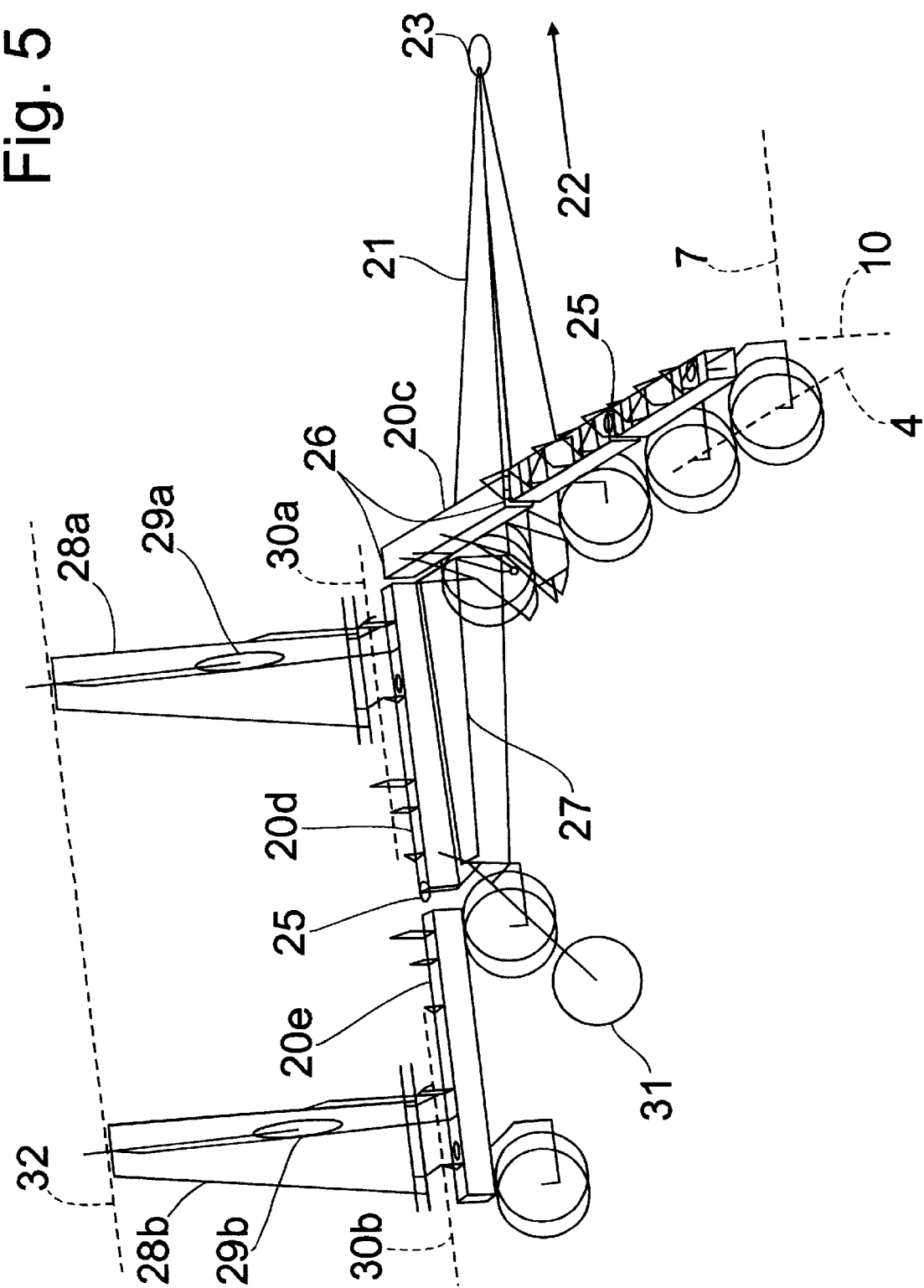
FIG. 5 is a schematic perspective view of the tool bar frame depicting the left wing section being folded rearwardly into the longitudinal transport configuration such that the tool frames and the ground engaging tools mounted thereon are positioned at least partially over top of the tool frames of the center section.

Referring now to FIGS. 4 and 5, the wing section tool frames 28 may be further rotated about the axes 30 relative to the rockshaft 20 to orient the tool frames 28 into a vertical transport position, whereupon the support wheels 29 are lifted clear of the ground and will pivot about the axis 32 to lie adjacent to the tool frame 28. The tool frames 27 corresponding to the center section 20c of the rockshaft 20 are not rotated vertically to convert the implement into a transport configuration. Instead, the tool frames 27 remain generally horizontally disposed in a lowered non-working position, as will be described in greater detail below.

Once the wing section tool frames 28 have been raised into the vertical transport position, the rockshaft 20 having been rotated into the second position to re-orient the axis 26 into a vertical orientation, the wing sections 20a, 20b, 20d, 20e, can be folded rearwardly about the pivot axis 26 to orient the wing sections in a longitudinal direction so that the transport width of the implement is primarily determined by the transverse length of the center section 20c of the rockshaft 20. Preferably, the support wheel assemblies 29 and wing section tool frames 28 are raised sufficiently in the transport position to clear over top of the central section tool frames 27.

Figure 6:
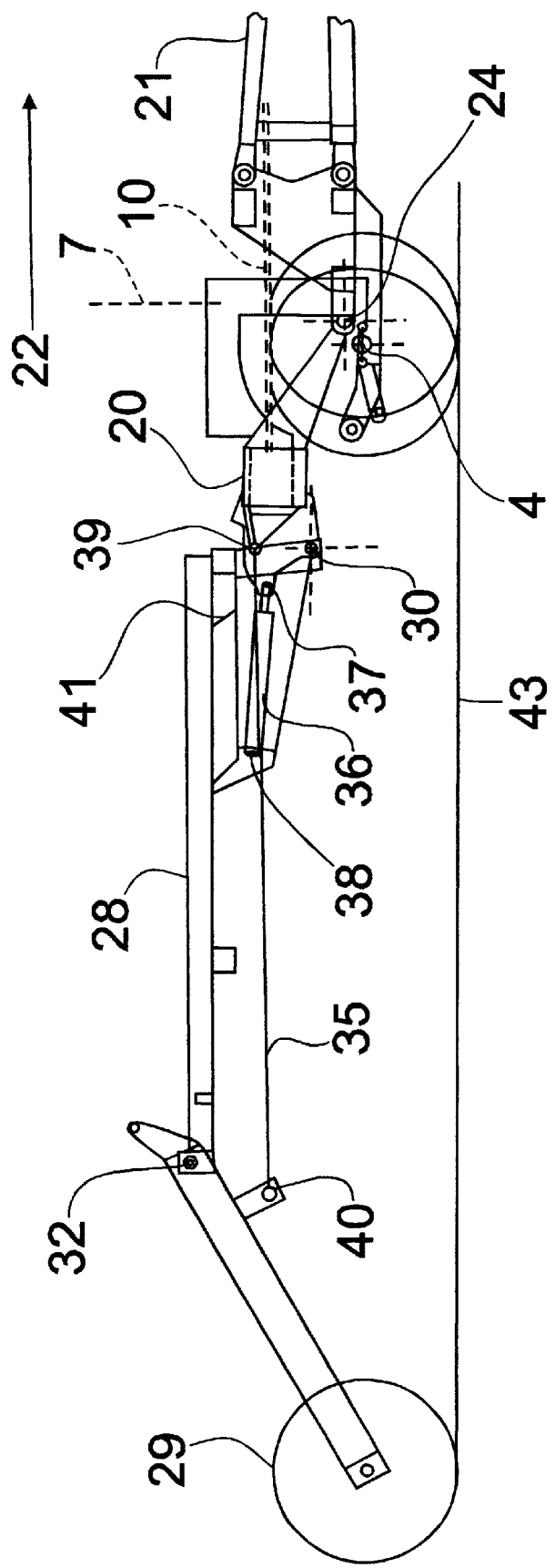
FIG. 6 is a schematic side elevational view of a wing section tool frame and the associated wing section of the rockshaft rotated into the first position with the tool frames being oriented in the lowered working position, corresponding to the orientation depicted in FIG. 1.
Figure 7:
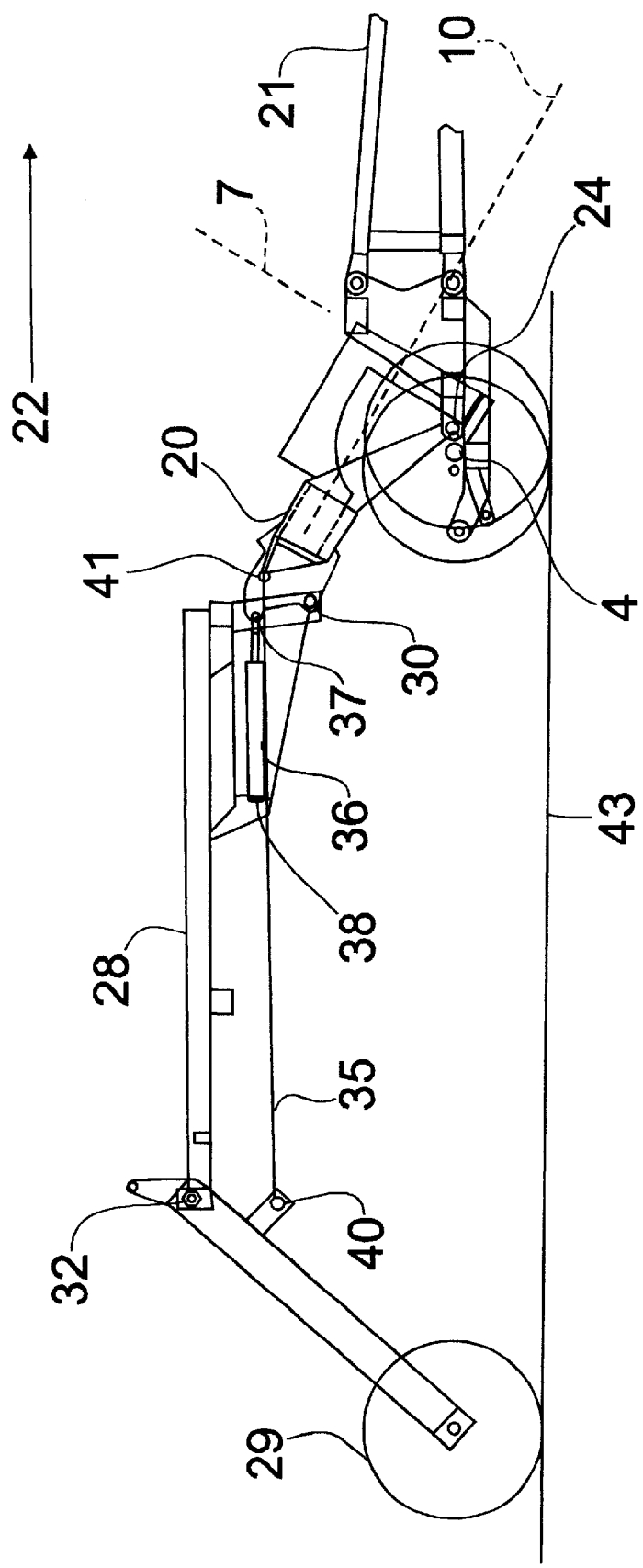
FIG. 7 is a schematic side elevational view of the wing section tool frame and associated wing section of the rockshaft rotated into the intermediate position to place the tool frame into the headlands position, corresponding to the orientation depicted in FIG. 2.
Figure 8:
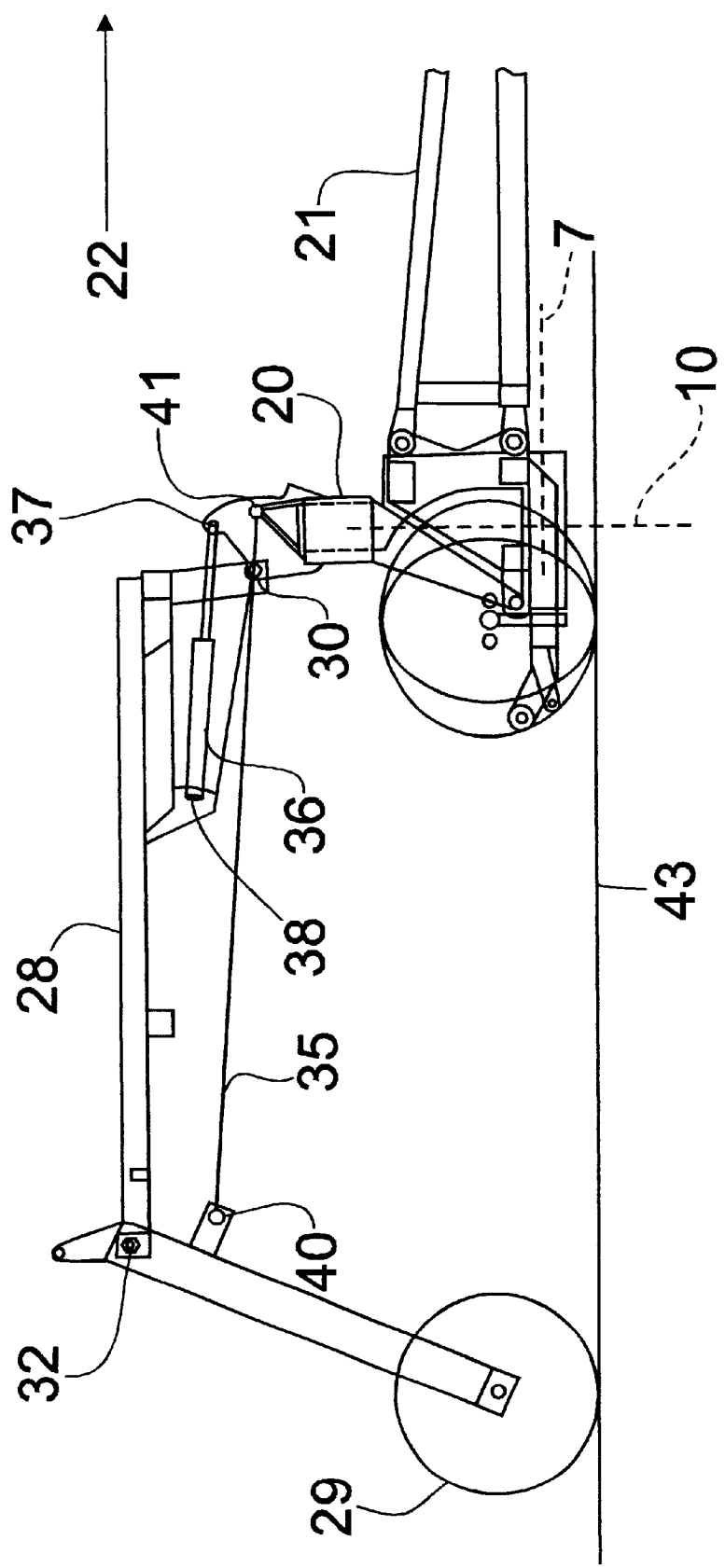
FIG. 8 is a schematic side elevational view of the wing section tool frame and associated wing section of the rockshaft rotated into the second position to place the tool frame into the raised non-working position, corresponding to the orientation depicted in FIG. 3.
Figure 12:
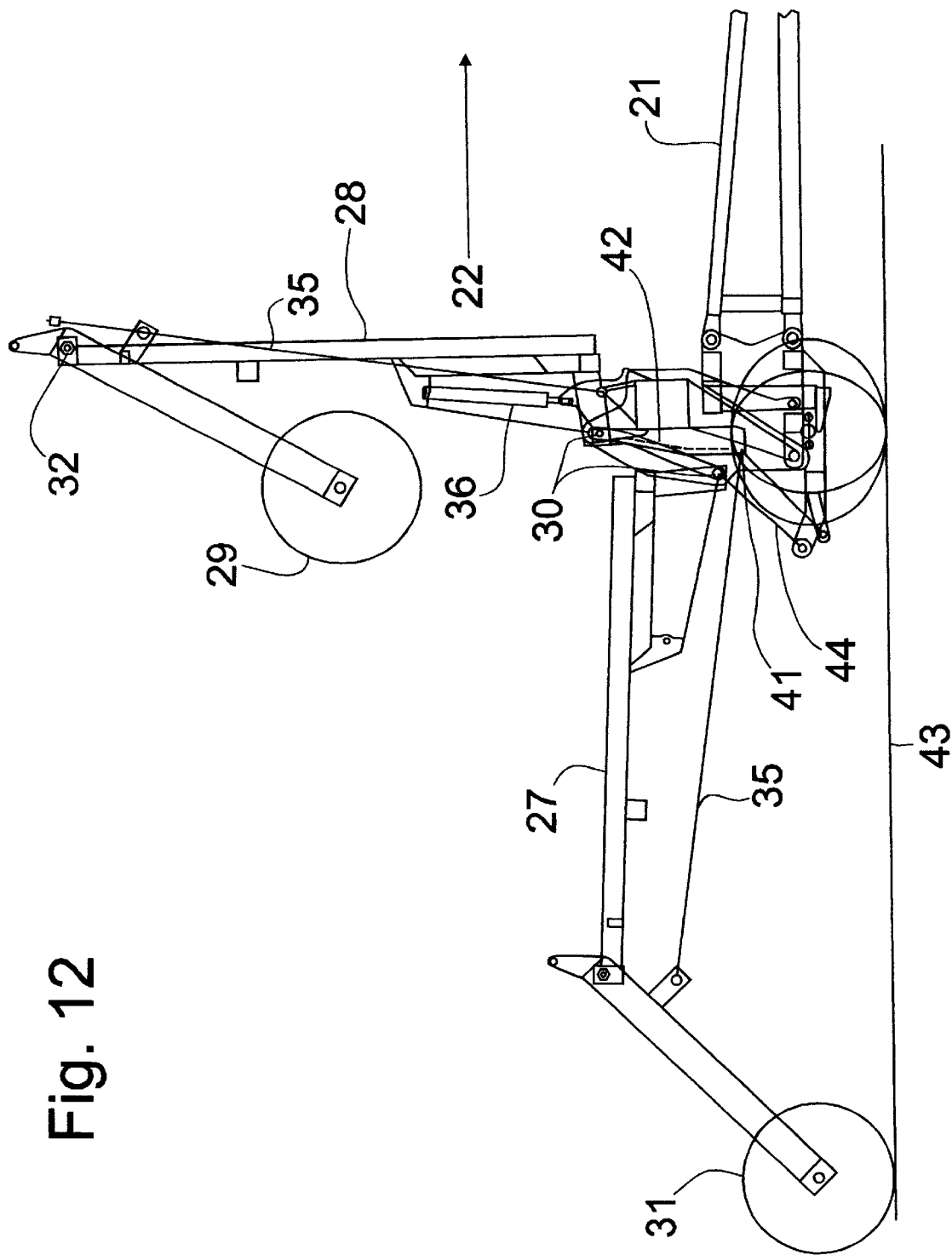
FIG. 12 is a schematic side elevational view of the folding tool bar implement with the wing section tool frames being raised into the vertical transport position, corresponding to the orientation depicted in FIG. 4.

Referring now to FIGS. 6–8, the wing section tool frames 28 and the associated wing section 20c of the rockshaft 20 can best be seen. In FIG. 6, the lowered working position of the tool frame 28 is depicted. The rockshaft 20 is rotated to the first position. A hydraulic cylinder 36 interconnects the rockshaft 20 at connection point 37 and the tool frame 28 at the connection point 38. As can be seen in FIGS. 7 and 8, the hydraulic cylinder 36 extends as the rockshaft 20 is rotated from the first position toward the second position, thus keeping the tool frame 28 in a generally horizontal orientation. The link 35 interconnecting the rockshaft 20 and the wheel assembly 29 also maintains the tool frame 28 in the generally horizontal orientation. Once the rockshaft 20 has pivoted into the second position, as depicted in FIG. 8, the hydraulic cylinder 36 has fully extended with the tool frame 28 in the raised non-working position. The movement of the tool frames 28 into the vertical transport position as shown in FIG. 12 is accomplished by a contraction of the hydraulic cylinder 36 after the rockshaft 20 has been rotated into the second position.

Figure 9:
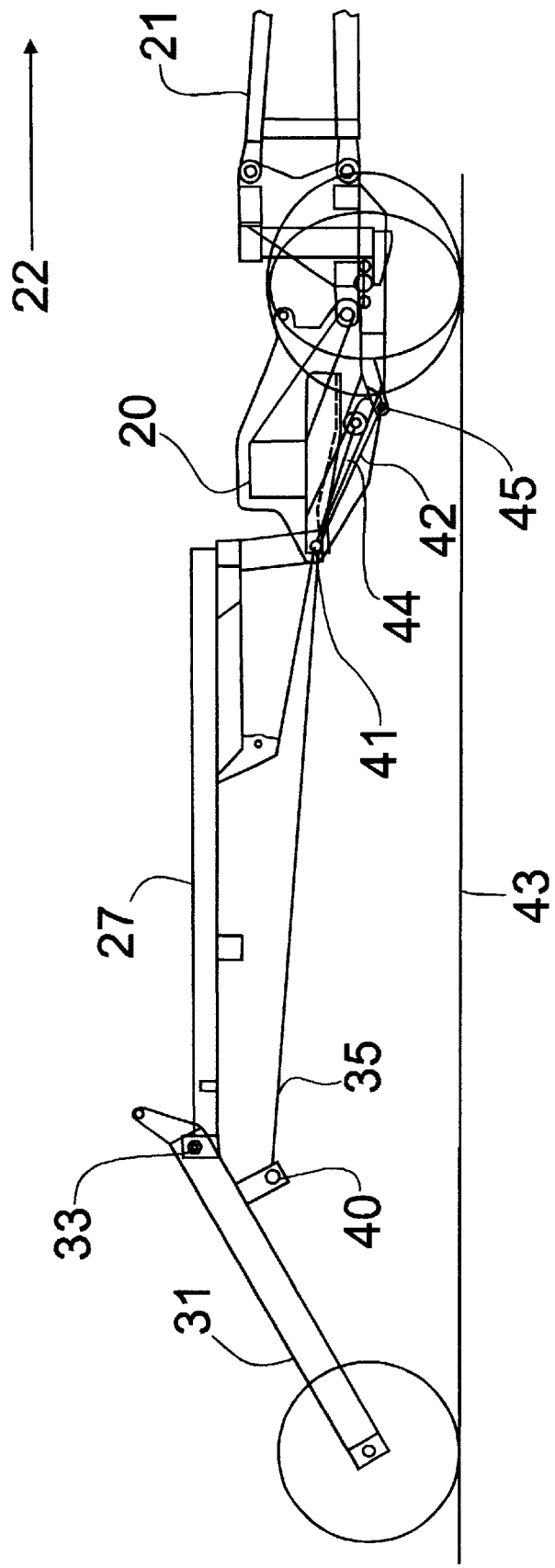
FIG. 9 is a schematic side elevational view of the center section tool frame and associated center section of the rockshaft rotated into the first position to place the tool frame into the lowered working position, corresponding to the orientation depicted in FIG. 1.

Referring now to FIG. 9, the center section tool frame 27 also moves between a lowered working position when the rockshaft 20 is rotated into the first position; a headlands position (shown in FIG. 10) when the rockshaft 20 is rotated into an intermediate position; and a raised non-working position when the rockshaft 20 is rotated into the second position. The center section tool frame 27, however, is connected at a pivot point 41 carried by the center section of the rockshaft 20 within a slot 42. A link 44 interconnects the pivot 41 to the draft frame 21 to control the position of the pivot 41, and thus the tool frame 27, within the slot 42. Accordingly, the rotation of the rockshaft 20 into the second position moves the center section tool frame 27 into a raised, non-working position that is oriented lower than the corresponding non-working positions of the wing section tool frames 28. The link 35 is also mounted on the rockshaft 20 for movement corresponding to the movement of the pivot 41 within the slot 42 so as to effect pivotal movement of the support wheel assembly 31 to maintain the tool frame 27 parallel to the ground.

Figure 10:
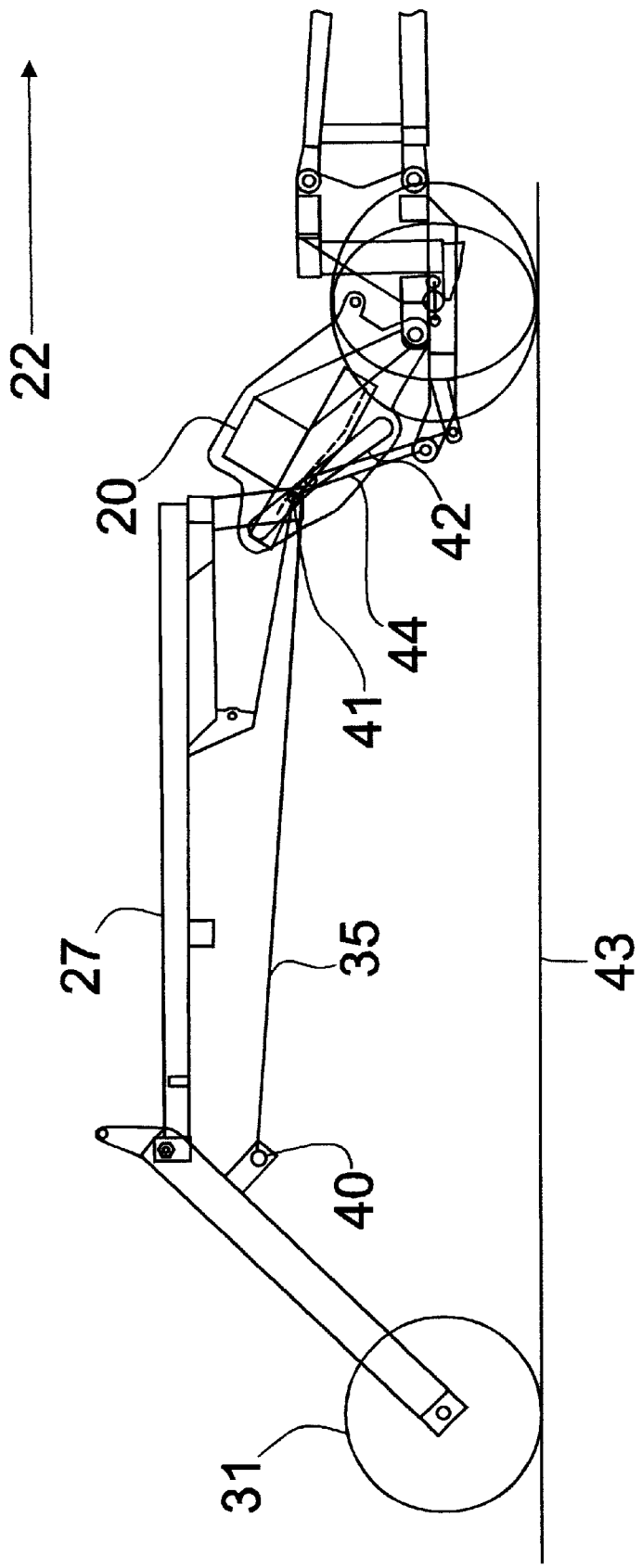
FIG. 10 is a schematic side elevational view of the center section tool frame and associated center section of the rockshaft rotated into the intermediate position to place the tool frame into the headlands position, corresponding to the orientation depicted in FIG. 2.
Figure 11:
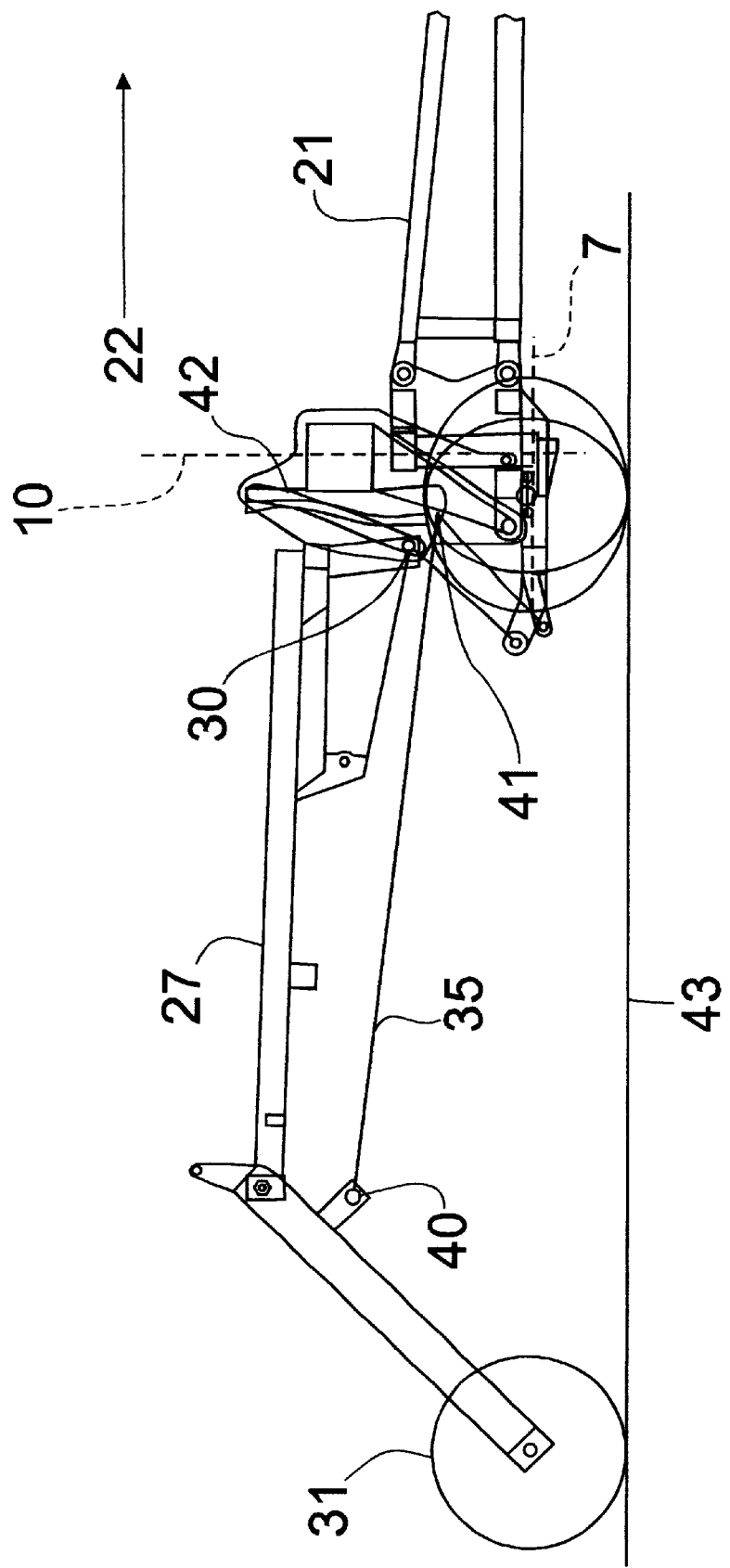
FIG. 11 is a schematic side elevational view of the center section tool frame and associated center section of the rockshaft rotated into the second position to place the tool frame into the raised non-working position, corresponding to the orientation depicted in FIG. 3.

Thus, when the wing sections 20a, 20b, 20d, 20e, are folded rearwardly with the wing section tool frames 28 raised into the vertical transport position, the center section tool frame 27 is lowered to permit the wing section tool frames 28 to locate over top of the center section tool frame 27. However, as best seen in FIG. 10, the rotation of the rockshaft 20 into the intermediate position to move the tool frames 27, 28 into the headlands position does not move the pivot point 41 sufficiently in the slot 42 to cause a substantial difference in height for the center section tool frame 27 as compared to the counterpart wing section tool frames 28. As depicted in FIG. 12, the wing section tool frames 28 are raised into the vertical transport position while the center section tool frame 27 is maintained at the lowered non-working position.

Figure 15:
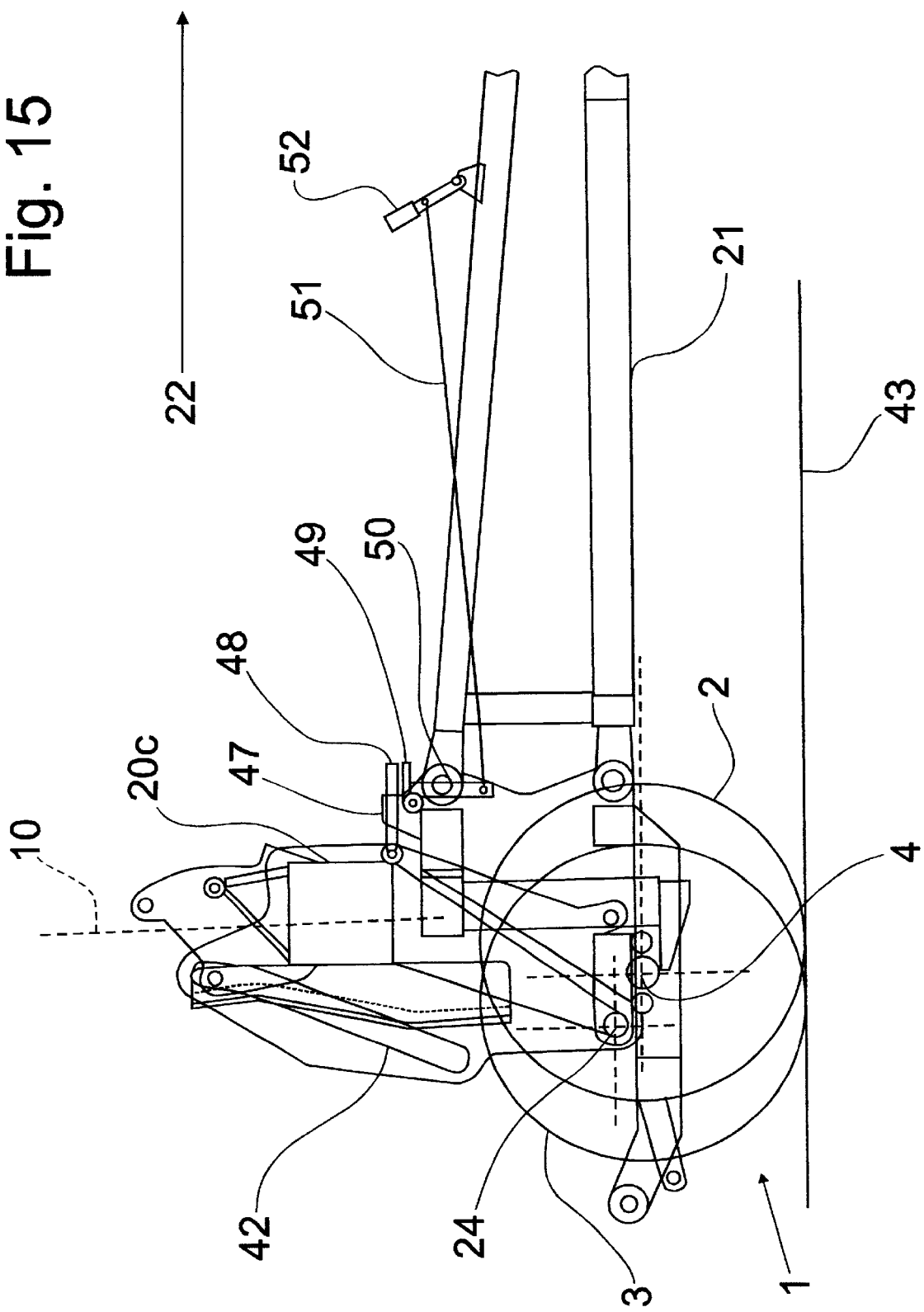
FIG. 15 is an enlarged schematic view of the center section of the rockshaft rotated into the second position, the tool frames being removed for purposes of clarity.
Figure 16:
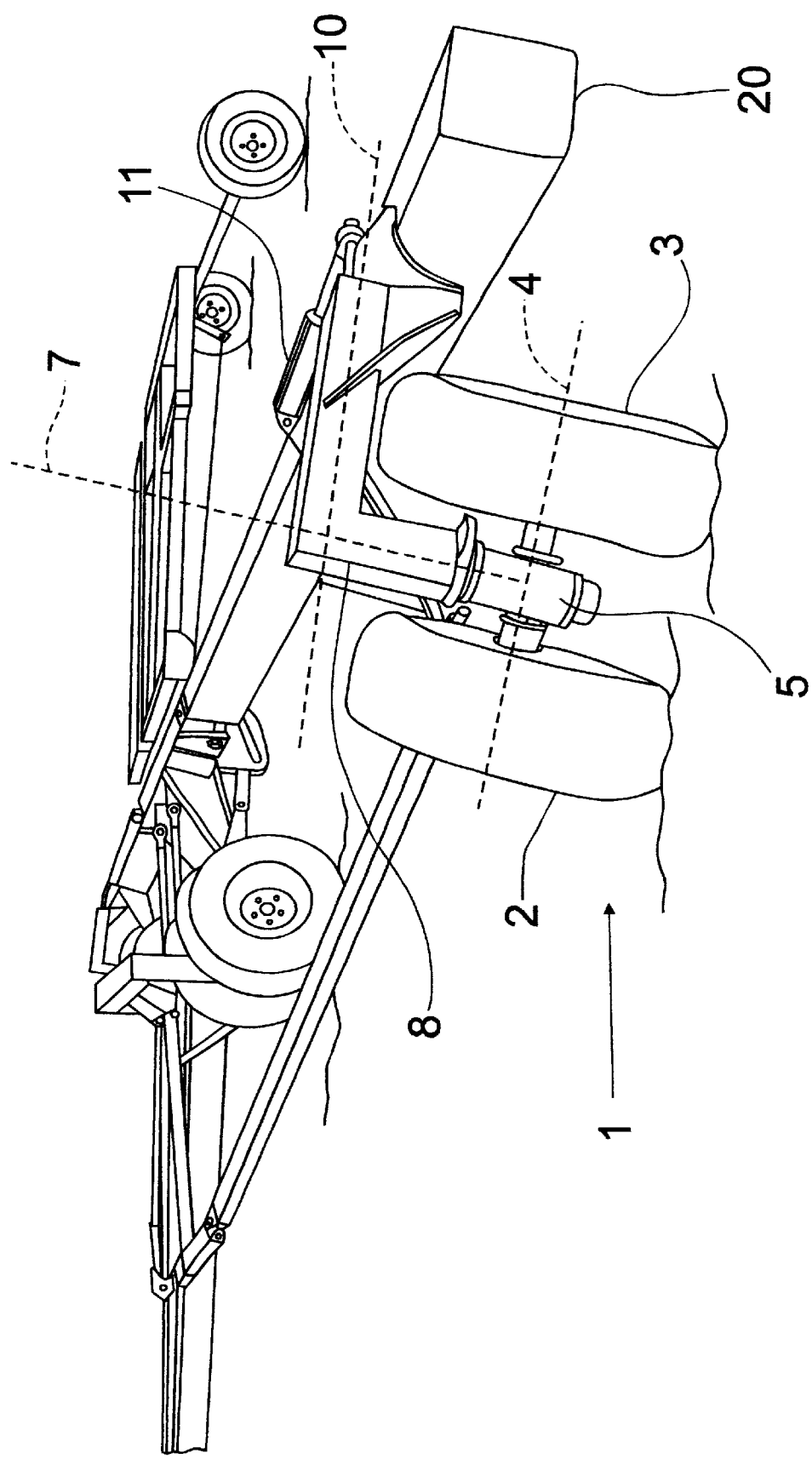
FIG. 16 is a schematic left front perspective view of the folding tool bar implement in the transverse field operating configuration with the rockshaft in the first position, the left wing section caster wheel being turned as though the implement were making a left turn.
Figure 17:
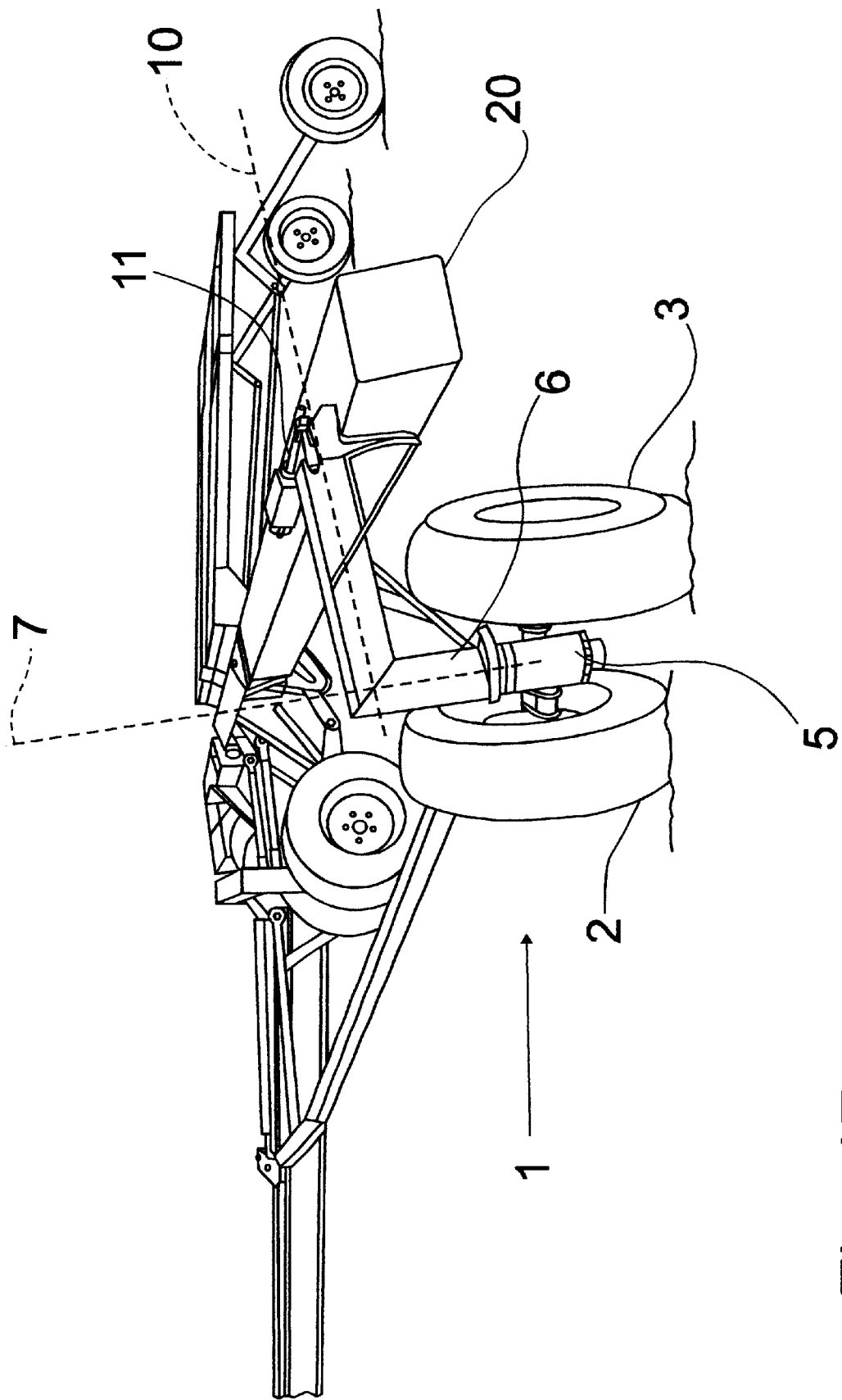
FIG. 17 is a schematic left front perspective view of the folding tool bar similar to that of FIG. 16, but with the rockshaft being rotated into the intermediate position to position the tool frames in the headlands position, the left wing section caster wheel being turned as though the implement were making a left turn.
Figure 18:
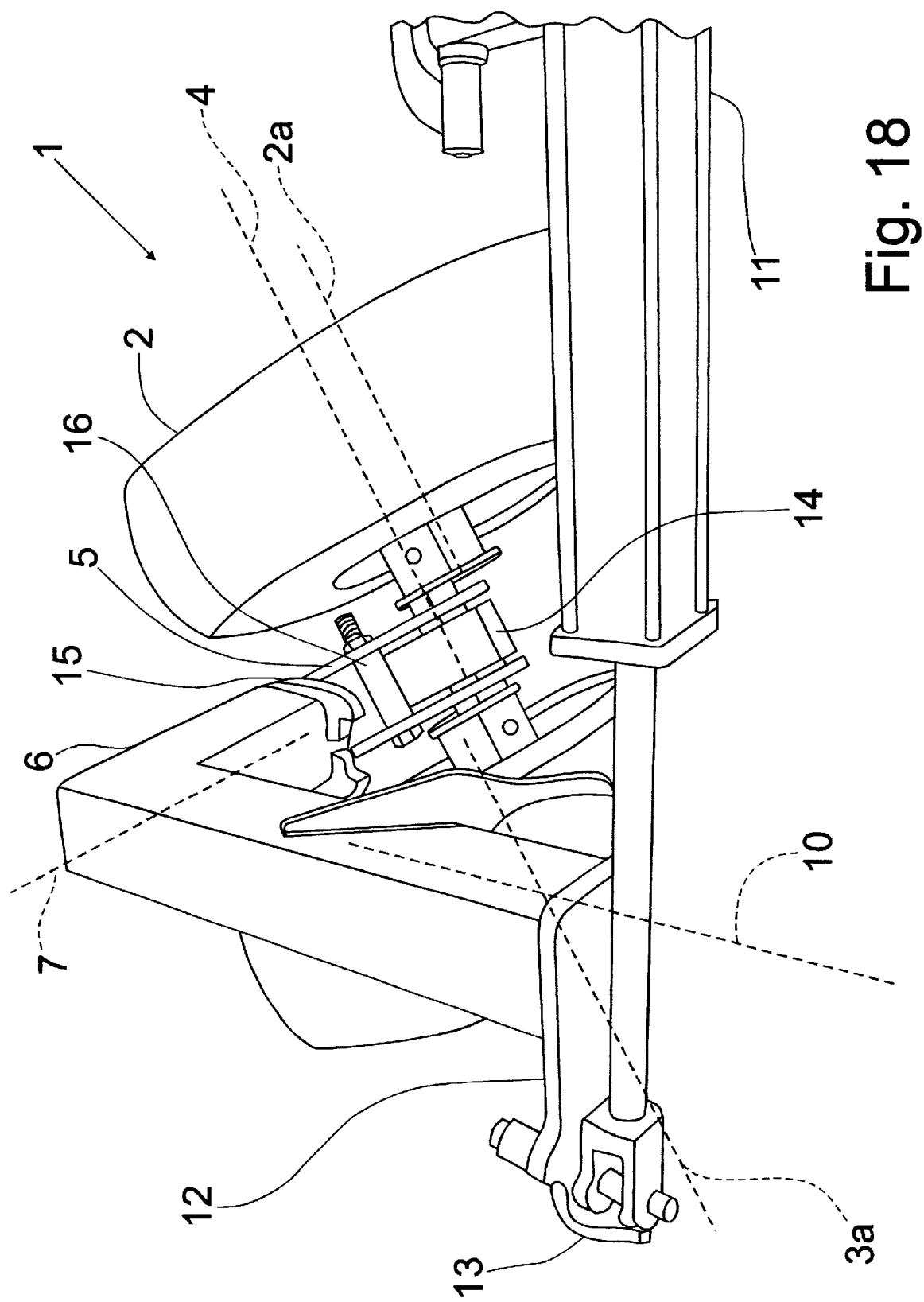
FIG. 18 is an enlarged perspective detail view of the wing section caster wheel in a turned orientation as depicted in FIGS. 16 and 17.

The details of the rockshaft 20 can best be seen in FIG. 15 wherein the center tool frame section 20c is shown in its fully rotated second position. In this position the center section tool frame 27 would be supported in the lower extremity of slot 42. Preferably, the rockshaft 20 may be locked into this second position by the interaction of a locking arm 48 with an abutment 47 carried by the draft frame 21. The position of the locking arm 48 is controlled by the arm 49 of an L-shaped rotatable member 50 connected to a manually operated control lever 52 by a linkage 51.

The details of the walking beam assembly 1 are best seen in FIGS. 16–19. The walking beam assembly 1 includes a pair of wheels 2, 3 supported in walking arrangement on a common axis of rotation 4. Each of the wheel axles 2a, 3a are offset from the axis of rotation 4 by an equal amount. All axes of rotation 2a, 3a, 4 are coplanar. The walking beam assembly 1 is supported on a first member 5 for rotation about the axis 4. The first member 5 is pivotally supported on a second member 6 for rotation about the castering first axis 7. In the various working positions, including the headlands position, of the tool frames 27, 28, the castering first axis of rotation 7 is maintained substantially vertical, wherein the support member 5 is permitted to freely caster about the castering axis 7 while supporting the second member 6 on the walking beam assembly 1.

Preferably, the second member 6 is L-shaped so as to provide adequate clearance for the wheels 2, 3 to flip over in the working position without interference from either the first or second members 5, 6. The second member 6 is further rotatably supported on the rockshaft 20 for rotation about a second axis 10. In the working positions, shown in FIGS. 16–18, the second member 6 is hydraulically locked by the hydraulic actuator 11 interconnecting the rockshaft 20 and the second member 6 through the flange 12 to prevent rotation about the second axis 10 which remains substantially horizontally oriented throughout the working positions of the tool frames 27, 28. Furthermore, throughout the working positions of the tool frames 27, 28, the castering action of the first member 5 about the castering axis 7 is unimpeded.

Figure 19:
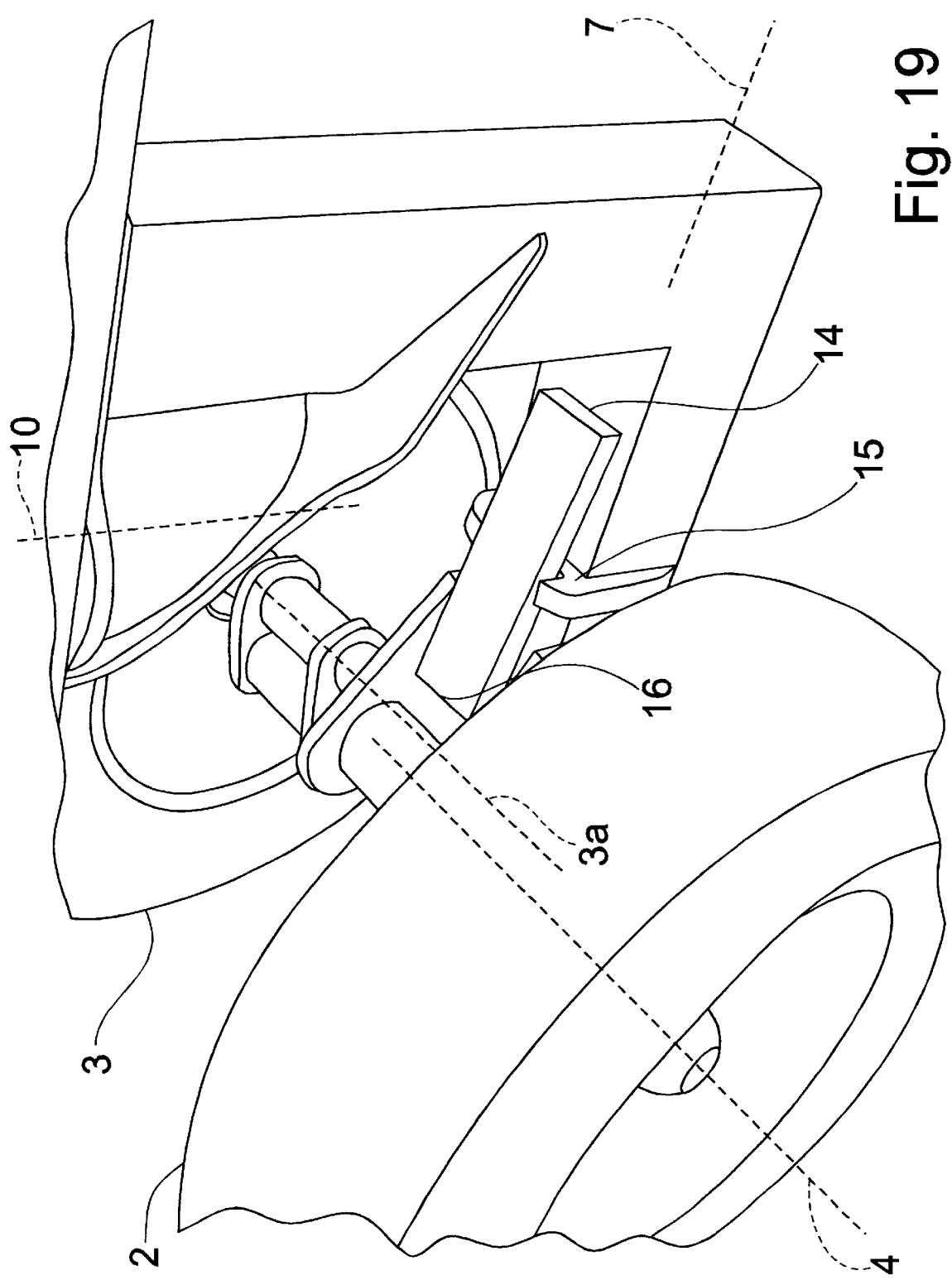
FIG. 19 is an enlarged perspective detail view of the wing section caster wheel with the rockshaft rotated into the second position with the caster lockout mechanism engaged to prevent the caster wheel from castering.

Rotation of the rockshaft 20 into the second position, as depicted in FIG. 19, brings the castering axis 7 into a substantially horizontal position next to the ground and moves the second axis 10, corresponding to the leg of the second member 6, into a generally vertical orientation. A latch tongue 14 is rotated about its pivotal attachment 16 to the first member 5 by gravity so as to engage the latch 15 to prevent rotation of the first and second members 5, 6 about the castering axis 7. The second member 6 is capable of rotation about the now vertical axis 10 to steer the wheel assembly 1 as will be necessary for reorientation of the walking beam assembly 1 when the wing sections are folded into a longitudinally extending transport configuration. The rotation of the rockshaft 20 back into the first position reorients the castering axis 7 into a vertical orientation and the second axis 10 into a horizontal orientation and causes the latch tongue 14 to disengage the latch 15 by gravity to permit movement of the first and second member 5, 6 about the castering axis 7.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. An agricultural implement comprising:
    a transversely extending rockshaft having a central section and a wing section disposed laterally of and on each opposing side of said central section; said rockshaft being rotatable about a transversely extending axis between a first position and a second position;
    a plurality of tool frames connected to said rockshaft and extending rearwardly thereof when in an operating configuration, each said tool frame carrying a ground engaging tool and being supported by a rearwardly positioned support wheel, said tool frames being generally vertically movable between a lowered working position and a raised non-working position by the rotation of said rockshaft from said first position to said second position; and
    an actuator interconnecting each at least some of said tool frame and said rockshaft to cause said tool frame to move into a generally vertical transport position, said wing sections being pivotable rearwardly when said rockshaft is moved into said second position and said tool frames are moved into said transport position to convert said implement into a transport configuration.

2. The agricultural implement of claim 1 wherein said rockshaft includes a pivot mechanism interconnecting each of said wing sections to a corresponding end of said center section, said pivot mechanism defining a wing pivot axis.

3. The agricultural implement of claim 2 wherein said wing pivot axis is oriented horizontally in a longitudinal direction when said rockshaft is in said first position, said wing pivot axis being oriented generally vertically when said rockshaft is in said second position to permit said wing sections to fold rearwardly relative to said center section.

4. The agricultural implement of claim 3 wherein said support wheel of each said tool frame is connected to the rockshaft by a link to keep said tool frame substantially parallel to the ground when moving between said lowered working position and said raised non-working position.

5. The agricultural implement of claim 4 wherein said tool frames corresponding to said center section remain in said non-working position to convert said agricultural implement into said transport configuration, said tool frames corresponding to said wing sections being positioned above said tool frames corresponding to said center section when said agricultural implement is in said transport configuration.

6. The agricultural implement of claim 5 wherein the tool frames corresponding to each said wing section being movable into said transport position independently of the other of said tool frames.

7. The agricultural implement of claim 6 wherein said tool frames corresponding to said center section are each connected to said rockshaft via a first slotted opening that allows the pivotal connection between said center section tool frame and said rockshaft to lower as said rockshaft is moved into said second position to keep said center section tool frame in a non-working position that is closer to the ground than the non-working position of said tool frames corresponding to said wing sections.

8. An agricultural implement of claim 7 wherein said links corresponding to said central section are each connected to said rockshaft by a second slotted opening that allows a pivotal connection between said link and said rockshaft to move vertically downwardly as said rockshaft is being rotated from said first position toward said second position, thereby causing a lesser amount of pivotal movement to said support wheel relative to the corresponding tool frame and allowing the tool frames associated with said center section to maintain a non-working position that is lower in height than said tool frames corresponding to said wing sections to permit said wing section tool frames to be positioned above the center section tool frames when in the transport configuration.

9. The agricultural implement of claim 8 wherein said slotted openings are configured such that the rotation of said rockshaft to an intermediate position between said first and second positions orients said center section tool frames at substantially the same orientation as said wing section tool frames, said intermediate position corresponding to a headland position in which the ground engaging tools are extracted from the ground but not to a height corresponding to said non-working position.

10. The agricultural implement of claim 9 wherein said actuators are coupled to a hydraulic system that permits said actuators to extend when said rockshaft is being rotated from said first position toward said second position such that said actuators are substantially fully extended when said rockshaft reaches said second position, whereby a subsequent selective contraction of said actuators cause rotation of said tool frames relative to said rockshaft to move said tool frames into said generally vertical transport position.

11. The agricultural implement of claim 10 wherein said rockshaft is supported by ground engaging wheels to support said rockshaft for movement over the surface of the ground.

12. A method of converting an agricultural implement from a transversely extending field working configuration to a longitudinally extending transport configuration, said agricultural implement having a rockshaft supported on ground engaging wheels for rotational movement about a generally transverse axis between a first position and a second position, said rockshaft having a central section and a pair of wing sections disposed respectively laterally to opposing sides of said center section, each said wing section being pivotally connected to said center section by a wing pivot axis; and a plurality of tool frames connected to said rockshaft and extending rearwardly thereof when said implement is in said field working configuration, each of said tool frames having a support wheel at a rearward portion of said tool frame so that said tool frame is supported by said rockshaft and said support wheel in an orientation extending generally parallel to the ground, comprising the steps of:

rotating said rockshaft from said first position to said second position to move said tool frames from a lowered working position to a raised non-working position;

pivoting said tool frames corresponding to said wing sections into a generally vertical transport position;

maintaining said tool frames corresponding to said center section in said non-working position; and folding said wing sections rearwardly to orient said wing sections generally orthogonally to said center section, thereby positioning said tool frames corresponding to said wing sections above said tool frames corresponding to said center section.

13. The method of claim 12 wherein said maintaining step lowers said tool frames corresponding to said center section to a non-working transport position to lower the center of gravity of said agricultural implement when in said transport configuration.

14. The method of claim 12 wherein said rotating step causes an extension of an actuator interconnecting said rockshaft and each said tool frame corresponding to said wing sections to keep said tool frames at said orientation generally parallel to the ground.

15. The method of claim 14 wherein said pivoting step includes the step of:

contracting said actuators interconnecting said rockshaft and said tool frames corresponding to said wing sections after said rockshaft has been moved into said second position.

16. The method of claim 15 wherein said rotating step re-orients said wing pivot axes from extending generally longitudinally when said rockshaft is in said first position to extending generally vertically when said rockshaft is in said second position.

* * * * *